United States Patent
Reddy

(10) Patent No.: US 6,168,381 B1
(45) Date of Patent: Jan. 2, 2001

(54) AIRFOIL ISOLATED LEADING EDGE COOLING

(75) Inventor: Bhanu M. Reddy, Boxford, MA (US)

(73) Assignee: General Electric Company, Cincinnati, OH (US)

( * ) Notice: Under 35 U.S.C. 154(b), the term of this patent shall be extended for 0 days.

(21) Appl. No.: 09/342,822

(22) Filed: Jun. 29, 1999

(51) Int. Cl.[7] ........................................ F01D 5/18
(52) U.S. Cl. ........................... 416/97 R; 415/116
(58) Field of Search .................... 416/95, 96 R, 416/97 R, 97 A, 96 A, 92, 90 R; 415/115, 114, 116

(56) References Cited

U.S. PATENT DOCUMENTS

| 4,770,608 | 9/1988 | Anderson et al. | ................. 416/97 R |
|---|---|---|---|
| 5,626,462 | * 5/1997 | Jackson et al. | .................... 416/97 R |
| 5,660,524 | 8/1997 | Lee et al. | ............................. 416/97 R |
| 5,720,431 | * 2/1998 | Sellers et al. | ....................... 416/97 R |

OTHER PUBLICATIONS

U.S. Patent aApplication Ser. No. 08/916,386, has matured into U.S. Pat. No. 5,902,093, and was considered by the Examiner.

* cited by examiner

Primary Examiner—Edward K. Look
Assistant Examiner—Ninh Nguyen
(74) Attorney, Agent, or Firm—Andrew C. Hess; Rodney M. Young

(57) ABSTRACT

A turbine blade includes an airfoil having a leading edge flow chamber disposed behind a leading edge in flow communication with an isolation flow channel disposed therebehind. The isolation channel is bounded on opposite sides by a pair of side flow channels.

20 Claims, 5 Drawing Sheets

AIRFOIL ISOLATED LEADING EDGE COOLING

The U.S. Government may have certain rights in this invention in accordance with Contract No. DAAH- 10-98-C-0023.

BACKGROUND OF THE INVENTION

The present invention relates generally to gas turbine engines, and, more specifically, to turbine blade cooling.

In a gas turbine engine, air is pressurized in a compressor and mixed with fuel and ignited in a combustor for generating hot combustion gases. The gases flow downstream through turbine stages which extract energy therefrom for powering the compressor and producing useful work, such as powering a fan for propelling an aircraft in flight.

A high pressure turbine is disposed immediately downstream from the combustor and receives the hottest combustion gases therefrom. The first stage turbine rotor blades have hollow airfoils which are supplied with a portion of air bled from the compressor for use as a coolant in removing heat from the blades during operation.

Each airfoil includes pressure and suction sidewalls joined together at opposite leading and trailing edges, and extending from root to tip. A platform is disposed at the airfoil root and defines a portion of the radially inner flowpath for the combustion gases. And, a dovetail is integrally jointed to the platform for mounting the individual blades in corresponding dovetail slots in the perimeter of a rotor disk.

Since the airfoil leading edge first engages the hot combustion gases, it requires substantial cooling for obtaining a useful blade life. Heat load from the combustion gases varies around the outer surface of the airfoil from the leading to trailing edges, and along the pressure and suction sidewalls. Various cooling circuits are provided inside the airfoil for cooling the different portions thereof. The different portions of the airfoil therefore operate at different temperatures, which introduces thermal stress therein that affects low cycle fatigue life of the blade.

Airfoil cooling may be effected using convection cooling, film cooling, or impingement cooling, or combinations thereof. The leading edge of a first stage turbine airfoil typically includes several rows or columns of film cooling holes fed by a common leading edge flow chamber or channel. Other film cooling holes and trailing edge holes may be fed by corresponding internal channels, such as multi-pass serpentine cooling channels.

In one conventional configuration, the leading edge chamber may be fed by a single flow channel located therebehind and separated therefrom by an intervening cold rib or bridge. The cold bridge includes a row of impingement holes which direct the air coolant in impingement against the backside of the leading edge for enhanced cooling thereof. However, the air flowing through the impingement supply channel is heated as it flows therethrough which correspondingly reduces impingement cooling effectiveness at the leading edge.

Since the cold bridge is disposed inside the airfoil and is itself cooled by the coolant therein, its temperature is substantially lower than that of the sidewalls of the airfoil around the leading edge. Accordingly, significant differential thermal expansion is effected between the sidewalls and the cold bridge which in turn creates large thermal stress which adversely affects fatigue life.

The airfoil may include additional film cooling holes disposed in either sidewall downstream of the leading edge, which are typically referred to as gill holes. Since the gill holes are typically provided with a common source of coolant inside the airfoil, and the pressure of the combustion gases outside of the airfoil varies, backflow margin across the gill holes may vary on opposite sides of the airfoil.

Backflow margin is defined as the pressure of the coolant inside the airfoil divided by the local pressure of the combustion gases outside the airfoil as experienced by each of the gill holes. Sufficient backflow margin must be maintained to prevent ingestion of the hot combustion gases into the airfoil, and ensure continuous discharge of the coolant through the gill holes.

Since the minimum required backflow margin must be set at the airfoil leading edge, the backflow margin on the lower pressure suction sidewall of the airfoil may be undesirably high.

Accordingly, it is desired to provide a gas turbine engine turbine blade having improved leading edge cooling which addresses one or more of these typical design problems.

BRIEF SUMMARY OF THE INVENTION

A turbine blade includes an airfoil having a leading edge flow chamber disposed behind a leading edge in flow communication with an isolation flow channel disposed therebehind. The isolation channel is bounded on opposite sides by a pair of side flow channels.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
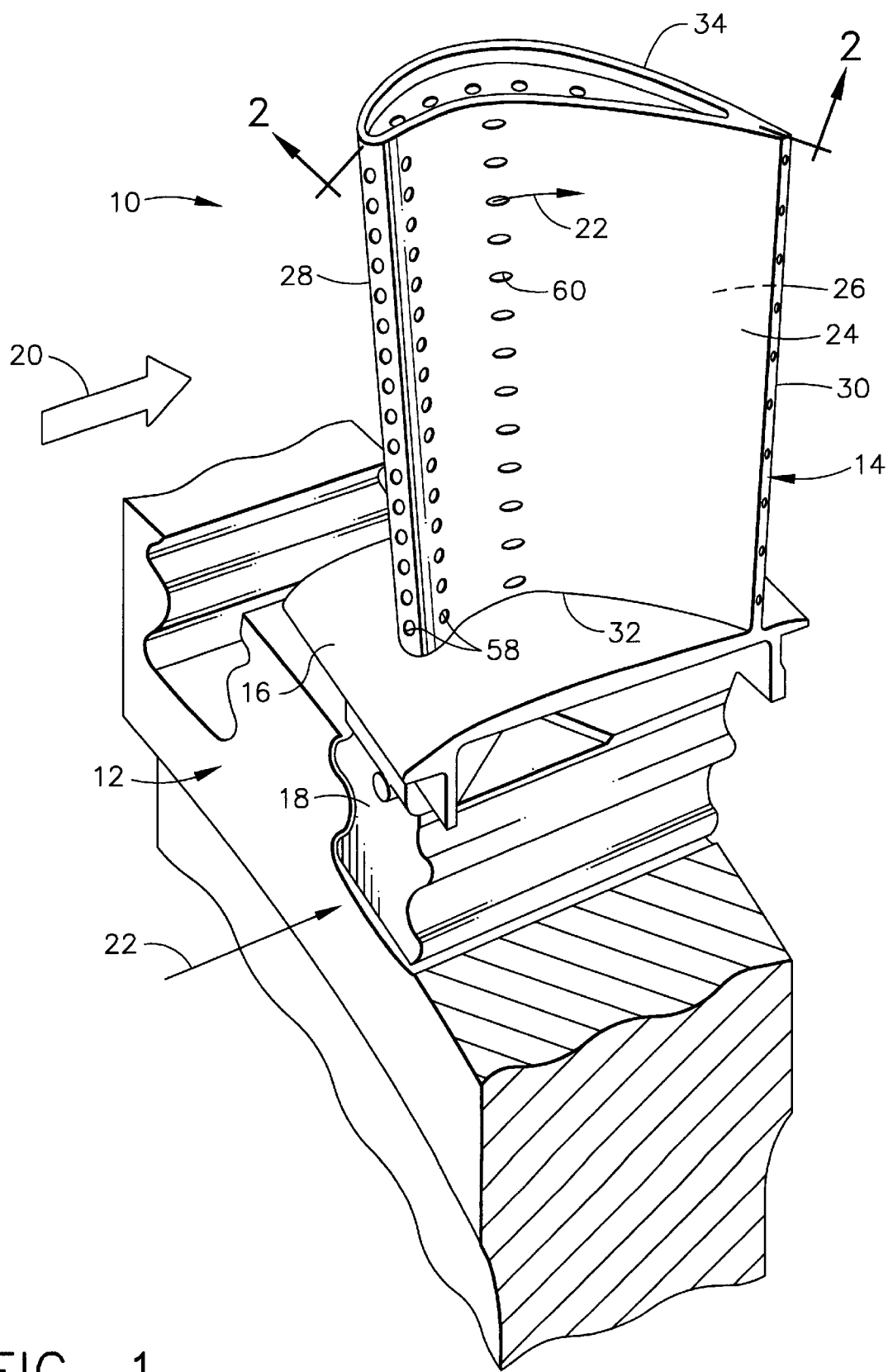
FIG. 1 is an isometric view of one of several turbine rotor blades mounted to the perimeter of a rotor disk having improved leading edge cooling in accordance with an exemplary embodiment of the present invention.

Illustrated in FIG. 1 is an exemplary first stage, high pressure turbine rotor blade 10 of a gas turbine engine, such as a turbofan engine for powering aircraft in flight. One of several identical blades is illustrated as mounted to the perimeter of a conventional rotor disk 12 shown in applicable part.

Each blade includes an airfoil 14, a platform 16, and a dovetail 18 formed as a unitary or one-piece component such as by casting. The airfoil 14 has any suitable profile for extracting energy from hot combustion gases 20 for rotating the disk 12 around an axial centerline axis during operation. The platform 16 defines a portion of the inner flowpath for the combustion gases 20. And, the dovetail 18 has any suitable configuration which matches a complementary dovetail slot formed in the perimeter of the rotor disk for being retained therein.

The airfoil 14 is hollow, and receives air 22 suitably bled from a compressor (not shown) and channeled thereto through the blade dovetails 18 in any conventional manner.

The airfoil 14 includes a first or pressure sidewall 24 which is generally concave, and a circumferentially opposite second or suction sidewall 26 which is generally convex. The sidewalls have a suitable aerodynamic crescent profile joined together at axially or chordally opposite leading and trailing edges 28,30, and are spaced apart therebetween. The sidewalls extend radially or longitudinally from a root 32 of the airfoil to a radially outer tip 34.

Figure 2:
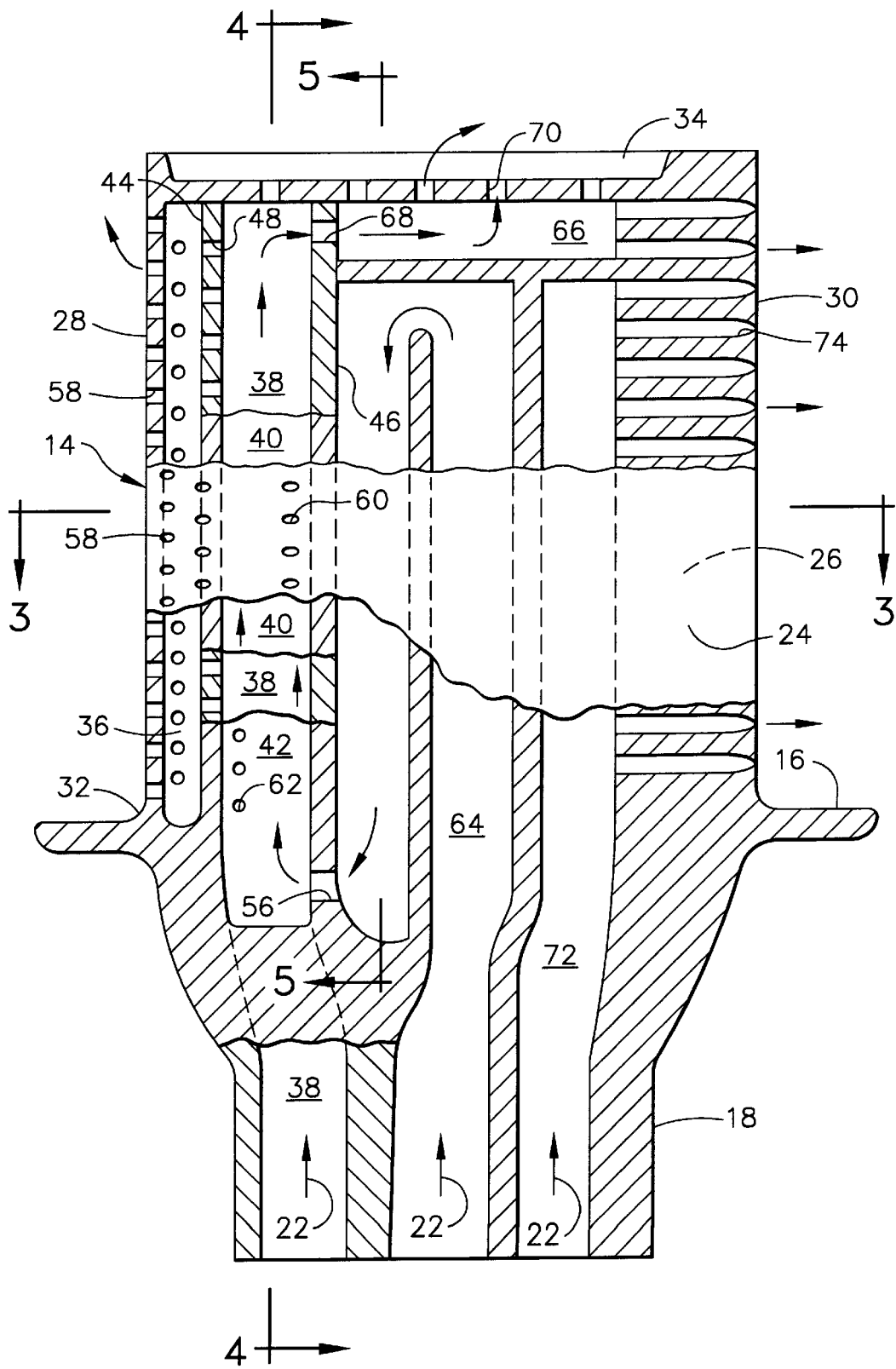
FIG. 2 is a partly sectional, elevational view through the turbine blade illustrated in FIG. 1 and taken along line 2—2, and illustrates leading edge impingement cooling fed by an isolation channel in accordance with an exemplary embodiment of the present invention.
Figure 3:
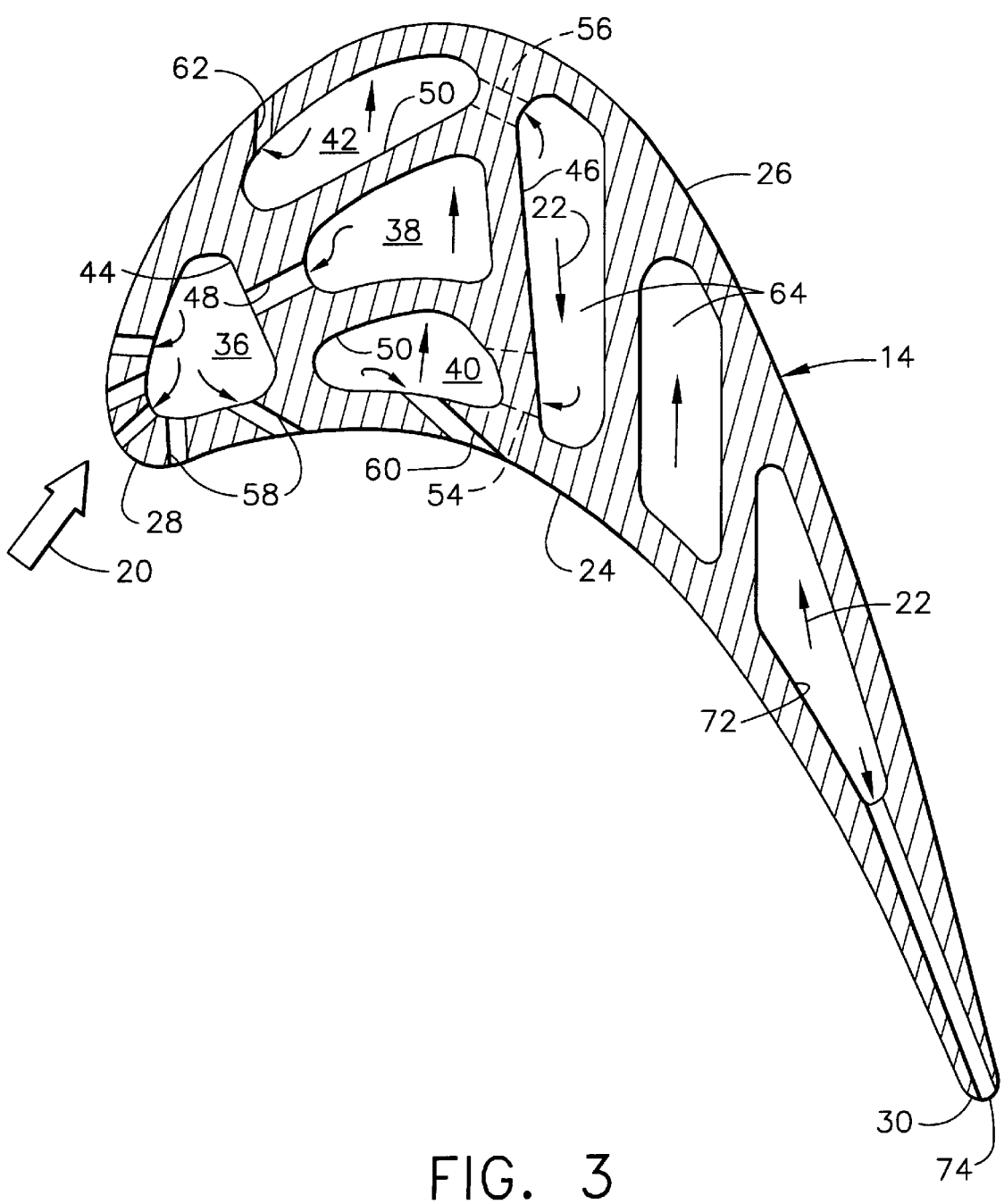
FIG. 3 is a radial sectional view through the airfoil illustrated in FIG. 2 and taken along line 3—3.

The airfoil is illustrated in more particularity in FIGS. 2 and 3 and includes a leading edge flow chamber 36 disposed between the sidewalls and directly behind the leading edge. In accordance with the present invention, the airfoil includes an isolation flow channel 38 disposed directly behind the leading edge chamber 36 which is isolated from both the pressure and suction sidewalls 24,26 of the airfoil. Isolation is effected by bounding or sandwiching the channel 38 on opposite circumferential sides of the airfoil by a pair of pressure and suction side flow channels 40,42 respectively.

The airfoil further includes forward and aft, longitudinally extending ribs or bridges 44,46 which chordally bound the isolation channel 38 and two side channels 40,42 on opposite chordal ends thereof. The forward bridge 44 separates the three laterally stacked channels 38,40,42 from the leading edge chamber 36 at the forward ends thereof, and the aft bridge 46 separates the three channels from the aft portion of the airfoil.

The forward bridge 44 includes a plurality of feed holes 48 extending chordally therethrough, and arranged in a longitudinal row or column. The feed holes 48 are thusly disposed in flow communication between the isolation channel 38 and the leading edge chamber 36 for channeling a portion of the air coolant 22 therethrough.

As best shown in FIG. 3, both end bridges 44,46 extend laterally or circumferentially between the two opposite sidewalls 24,26 in an integral casting therewith. One side of the forward bridge 44 defines the aft end of the leading edge chamber 36. The opposite side of the forward bridge 44 engages in part each of the three channels 38,40,42.

Similarly, one side of the aft bridge 46 faces the trailing edge, and the opposite side of the aft bridge engages in part the aft ends of each of the three channels 38,40,42. A pair of internal radial side ribs or bridges 50 bound the isolation channel 38 on its pressure and suction sides, and correspondingly bounds the side channels 40,42 on their internal sides adjoining the center isolation channel 38 therebetween.

Accordingly, the isolation channel 38 is bound on four sides by the several bridges 44,46,50 and is isolated near the center of the airfoil. The side channels 40,42 extend the full chordal length of the isolation channel to separate that channel from the pressure and suction sidewalls to provide thermal insulation and isolation thereof.

Figure 4:
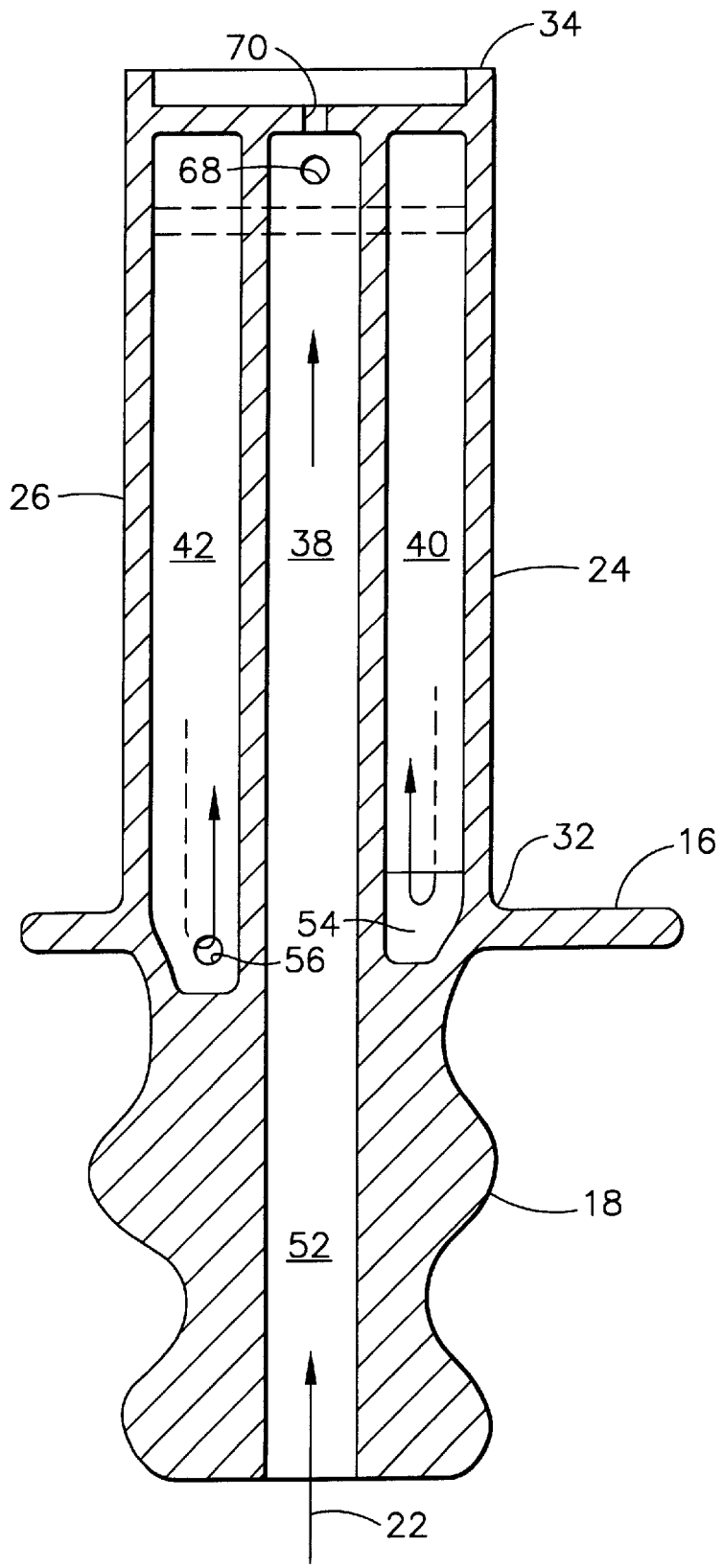
FIG. 4 is an elevational sectional view of the turbine blade illustrated in FIG. 2 and taken along line 4—4.
Figure 5:
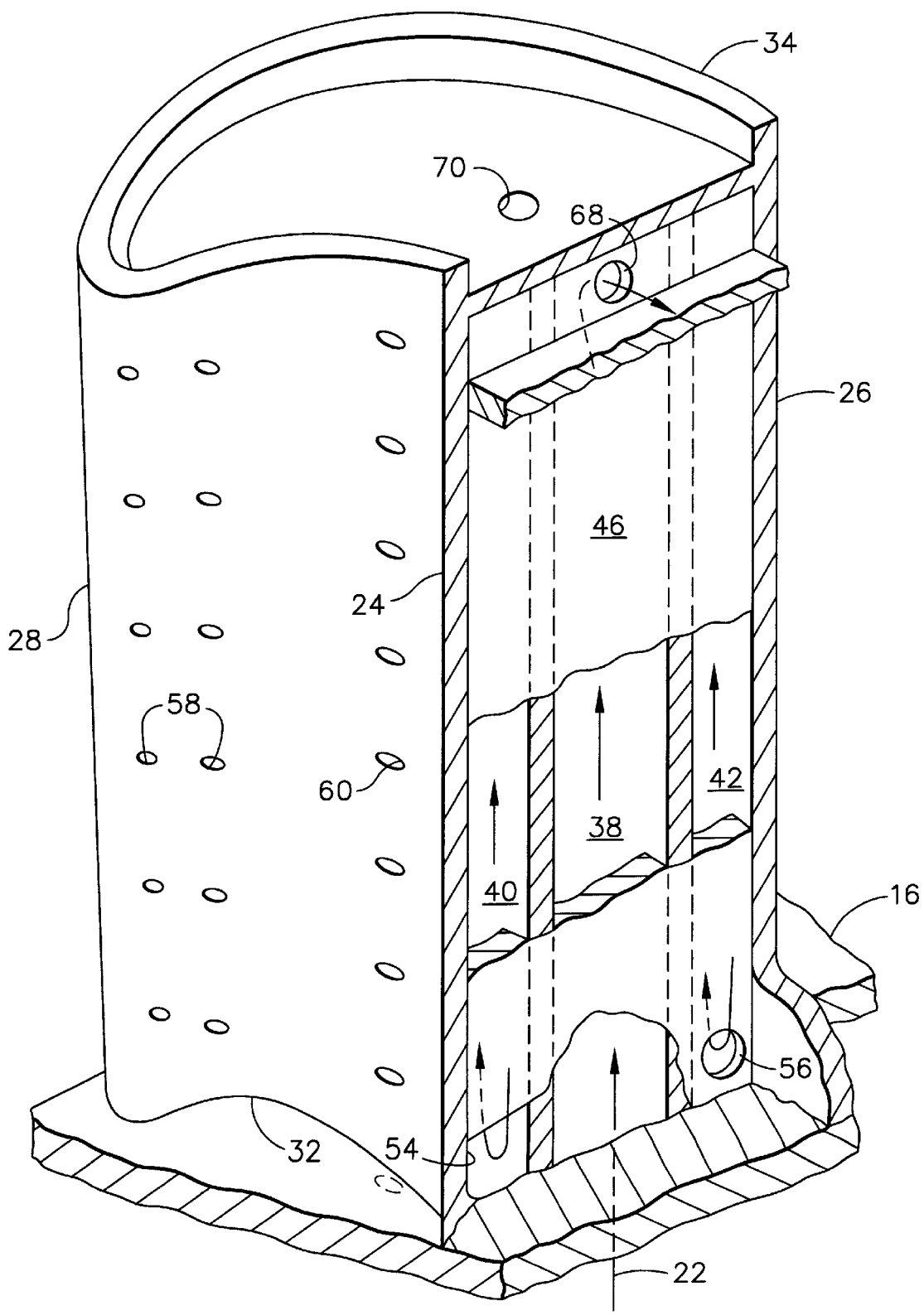
FIG. 5 is an isometric, elevational partly sectional view of the leading edge portion of the turbine blade illustrated in FIG. 2 and taken generally along line 5—5.

As shown in FIGS. 4 and 5, the isolation channel 38 extends the full longitudinal height of the blade, and includes a first inlet 52 at the bottom thereof at the entrance to the dovetail 18. The pressure side channel 40 extends longitudinally for the full radial height or span of the airfoil, and includes at its bottom a second inlet 54 preferably disposed near the platform. And, the suction side channel 42 also extends the full longitudinal height of the airfoil, and includes at its bottom a third inlet 56 also disposed near the platform.

The three inlets 52,54,56 are preferably independent of each other for separately receiving corresponding portions of the coolant 22 in parallel flow.

As shown in FIG. 3, the coolant 22 flows radially outwardly through the three channels 38,40,42 and is suitably discharged therefrom. The row of feed holes 48 provide respective outlets for the isolation channel 38 which feed the coolant into the leading edge chamber 36 over its entire longitudinal height from root to tip of the airfoil.

As shown in FIG. 3, a plurality of film cooling holes 58 extend through one or both of the sidewalls 24,26 near or around the leading edge 28 in one or more longitudinal rows, such as the five exemplary rows illustrated. The film cooling holes 58 may have any conventional form and are disposed in flow communication with the leading edge chamber 36 for discharging the coolant therefrom to form respective films of cooling air over the outer surface of the airfoil for protection against the hot combustion gases 20 which flow thereover during operation.

Additional film cooling holes may be disposed aft of the airfoil leading edge for providing additional film cooling in any suitable manner. For example, a row of pressure side, film cooling gill holes 60 may be disposed through the pressure side wall 24 in flow communication with the pressure side channel 40 for discharging the coolant therefrom in a film of cooling air over the outer surface of the airfoil.

Similarly, a row of suction side film cooling gill holes 62 may be disposed through the suction sidewall 26 in flow communication with the suction side channel 42 for discharging the coolant therefrom in a film of air along the suction side of the airfoil.

In the preferred embodiment illustrated in FIGS. 2 and 3, the feed holes 48 face the back or inner side of the leading edge 28 generally normal thereto for directing the coolant in impingement thereagainst. The configuration of the leading edge chamber 36 with impingement and film cooling of the leading edge may take any conventional form. However, by introducing the isolation channel 38 and its thermally insulating side channels 40,42, substantial improvements in performance may be obtained over conventional impingement cooling.

Most significantly, since the coolant channeled inside the isolation channel 38 is protected from being heated from the pressure and suction sides of the airfoil, it provides lower temperature cooling air for impingement of the leading edge for improving the cooling thereof.

Since the coolant flowing through the two side channels 40,42 is heated during operation by heat transfer from the corresponding pressure and suction sidewalls, the temperature of the coolant in the side channels is greater than the temperature of the coolant in the isolation channel 38 centered therebetween.

Accordingly, the hotter coolant in the side channels 40,42 may be used to additional advantage to heat the forward bridge 44 during operation, notwithstanding the lower temperature coolant channeled through the feed holes 48. Since both side channels 40,42 directly engage the forward bridge 44 at their forward ends, they are effective for heating the forward bridge with the heated coolant channeled through the side channels. This creates an effective warm forward bridge 44 which decreases the differential temperature with the airfoil around its leading edge for correspondingly reducing thermally induced stress therein for further enhancing fatigue life of the blade.

Additional heating of the forward bridge 44 may be effected in accordance with a preferred embodiment of the present invention as initially illustrated in FIGS. 2 and 3. In this embodiment, a serpentine mid flow channel 64 is disposed between the aft bridge 46 and the trailing edge 30 and terminates in flow communication with the second and third inlets 54,56 for discharging into the corresponding pressure and suction side channels 40,42 preheated coolant as it extracts heat from the aft portion of the airfoil during operation.

The mid channel 64 is preferably a multi-pass serpentine channel having any conventional configuration. For example, the mid channel 64 includes a first pass or leg which begins at the bottom of the dovetail 18 and extends longitudinally toward the airfoil tip and then turns radially inwardly in a second pass or leg which terminates below the airfoil root near the blade platform.

The second pass of the mid channel terminates at the bottom of the aft bridge 46 in flow communication with the two inlets 54,56 as illustrated in more detail in FIGS. 4 and 5. In this way, the coolant is preheated as it flows through the airfoil in the first two passes of the serpentine channel to provide preheated coolant to the two side channels 40,42.

Those two side channels define a pair of parallel, third passes or legs of the serpentine channel which extend radially outwardly to the airfoil tip. The coolant from the second serpentine pass is thusly split in two parallel portions for flow through the two side channels 40,42 as the last passes of the serpentine circuit.

Accordingly, the coolant flow in the two side channels 40,42 is additionally preheated in the serpentine channel for further heating the forward bridge 44 to reduce differential temperature with the leading edge and correspondingly reduce thermal stress. Since the pressure and suction sides of the airfoil aft of the airfoil leading edge experience a smaller heat load from the combustion gases, the warmer coolant channeled through the two side channels 40,42 is nevertheless sufficient for adequately cooling the airfoil in these regions.

And, most significantly, the isolated center channel 38 limits heating of the coolant therethrough for providing cooler air for impingement cooling the leading edge. The isolation channel 38 is preferably an independent channel directly receiving the coolant 22 from the entrance in the dovetail 18 as shown in FIGS. 2 and 4 for maximizing the cooling potential of the coolant as it is discharged through the feed holes 48 in impingement against the back of the leading edge.

Another advantage of uncoupling the two side channels 40,42 from the center channel 38 is that the coolant flow thereto may be tailored to different requirements. The enhanced cooling effected by the isolation channel 38 and the preheated forward bridge 44 have been addressed above. Since the pressure of the combustion gases is different on the pressure and suction sidewalls 24,26 of the airfoil, the second and third inlets 54,56 for the corresponding side channels 40,42 may be used to advantage.

More specifically, since the pressure of the combustion gases over the pressure sidewall is greater than the pressure of the gases over the suction sidewall, the third inlet 56 illustrated in FIG. 5 may be preferably smaller in flow area than the second inlet 54 for metering the coolant to the suction side channel 40 at a reduced pressure to correspondingly reduce backflow margin of the coolant at the suction side gill holes 62.

If both pressure and suction side gill holes 60,62 are fed from a common channel, the required backflow margin for the pressure side gill holes would correspondingly cause a greater than required backflow margin for the suction side gill holes. However, the third inlet 56 may be sized as a metering hole for reducing pressure of the coolant in the suction side channel 42 and thusly reducing pressure drop and backflow margin across the suction side gill holes 62 for improving performance. Correspondingly, the second inlet 54 is preferably as large as practical for minimizing pressure losses therethrough for ensuring maximum backflow margin across the pressure side gill holes 60.

An additional advantage may be obtained from using the isolation channel 38, as initially illustrated in FIG. 2. The airfoil tip 34 is also subjected to the hot combustion gases as they flow thereover during operation. Near the end of blade life, cracks may initiate in the airfoil tip and propagate radially inwardly. The growth of such cracks may be arrested or minimized by introducing a chordally extending tip chamber 66 disposed directly below or under the airfoil tip 34 which defines the cap enclosing the top of the airfoil. The tip chamber is defined in lower part by an axial rib which extends from the aft bridge 46 to the trailing edge 30.

The aft bridge includes an outlet hole 68 at the radially outer end thereof disposed in flow communication between the isolation channel 38 and the tip chamber 66 for channeling the coolant thereto.

The airfoil tip preferably includes a plurality of tip holes 70 from which a portion of the coolant may be discharged from the tip chamber radially outwardly above the airfoil tip.

As shown in FIGS. 4 and 5, the outlet hole 68 provides relatively low temperature coolant from the isolation channel 38 to feed the tip chamber 66 for enhanced cooling of this region. The tip chamber 66 and the enhanced cooling thereof are effective for arresting crack growth propagating radially inwardly from the airfoil tip during operation. And, the tip chamber 66 isolates the several cooling channels or circuits of the airfoil from the tip to prevent short circuiting of the coolant supply for maintaining effective cooling of the airfoil notwithstanding tip cracks in this region.

As shown in FIG. 2, the airfoil may also include an independent trailing edge flow channel 72 extending radially from an inlet at the base of the dovetail to a radially outer end below the tip chamber 66. A row of conventional trailing edge discharge holes 74 are disposed in flow communication with the channel 72 for discharging the coolant therethrough for cooling the trailing edge region of the airfoil.

The isolation channel 38 and its thermally insulating side channels 40,42 provide many benefits in improving performance of a gas turbine engine turbine blade. These channels may be introduced in otherwise conventional turbine blades for enjoying one or more of the many advantages attributable thereto.

These channels have particular utility when cooperating with the leading edge chamber 36 for impingement cooling the airfoil leading edge. Improved airfoil cooling leads to enhanced blade life, and can permit the operation of the blade at higher combustion gas temperature if desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A turbine blade comprising:

airfoil pressure and suction sidewalls joined together at leading and trailing edges and extending from a root to tip;

a leading edge flow chamber disposed between said sidewalls and behind said leading edge;

pressure and suction side flow channels laterally bounding an isolation flow channel therebetween and extending continuously over the full chordal length thereof, and separated from said leading edge chamber by a forward bridge therebetween; and a row of feed holes disposed through said forward bridge in flow communication between said isolation channel and said leading edge chamber for channeling a coolant therethrough.

2. A blade according to claim 1 wherein said forward bridge engages in part each of said isolation channel and side channels.

3. A blade according to claim 2 further comprising an aft bridge extending between said pressure and suction sidewalls and engaging in part each of said isolation channel and side channels.

4. A blade according to claim 3 wherein said feed holes face a back side of said leading edge for directing said coolant in impingement thereagainst.

5. A blade according to claim 4 further comprising a row of film cooling holes extending through one of said sidewalls near said leading edge, and disposed in flow communication with said leading edge chamber for discharging said coolant therefrom.

6. A blade according to claim 5 wherein said isolation channel and side channels have respective independent first, second and third inlets for receiving said coolant in parallel.

7. A blade according to claim 6 further comprising a mid flow channel disposed between said aft bridge and trailing edge, and terminating in flow communication with said second and third inlets for discharging thereto said coolant.

8. A blade according to claim 7 wherein said mid channel is a serpentine flow channel and said side channels define parallel last passes thereof.

9. A blade according to claim 7 further comprising a row of film cooling gill holes disposed through said suction sidewall in flow communication with said suction side channel; and wherein said third inlet is smaller than said second inlet for metering said coolant to said suction side channel at a reduced pressure to reduce backflow margin at said gill holes.

10. A blade according to claim 5 further comprising a tip chamber disposed under said airfoil tip and extending from said aft bridge to said trailing edge, with said aft bridge including an outlet hole disposed in flow communication between said isolation channel and said tip chamber for channeling said coolant thereto.

11. A turbine blade comprising an airfoil having a leading edge flow chamber disposed behind a leading edge in flow communication with an isolation flow channel disposed therebehind, with said isolation channel being bounded on opposite sides by a single pair of side flow channels.

12. A blade according to claim 11 further comprising forward and aft bridges extending between pressure and suction sidewalls of said airfoil, and bounding said isolation channel and said side channels on opposite ends, and said forward bridge includes a row of feed holes disposed in flow communication between said leading edge chamber and said isolation channel.

13. A blade according to claim 12 wherein:

said feed holes face a back side of said leading edge for directing said coolant in impingement thereagainst; and said leading edge includes a row of film cooling holes for discharging said coolant from said leading edge chamber.

14. A blade according to claim 13 wherein each of said isolation channel and side channels has an independent inlet for receiving said coolant in parallel.

15. A blade according to claim 14 further comprising a serpentine mid flow channel terminating at said aft bridge for supplying said coolant in parallel to said inlets of said pair of side channels.

16. A blade according to claim 15 further comprising a row of film cooling gill holes disposed through said suction sidewall of said airfoil in flow communication with one of said side channels, and said inlet thereof is smaller than said inlet to said other side channel for reducing backflow margin across said gill holes.

17. A turbine blade comprising:

an airfoil having a leading edge flow chamber disposed behind a leading edge in flow communication with an isolation flow channel disposed therebehind;

with said isolation channel being bounded on opposite sides by a pair of side flow channels extending between forward and aft bridges joining opposite pressure and suction sidewalls of said airfoil; and a serpentine mid flow channel terminating at said aft bridge for supplying coolant in parallel to said pair of side channels.

18. A blade according to claim 17 wherein.

said forward bridge includes a row of feed holes disposed in flow communication between said leading edge chamber and said isolation channel; and said leading edge includes a row of film cooling holes for discharging said coolant from said leading edge chamber.

19. A blade according to claim 18 wherein each of said isolation channel and side channels has an independent inlet for receiving said coolant in parallel.

20. A blade according to claim 19 further comprising a row of film cooling gill holes disposed through said suction sidewall in flow communication with one of said side channels, and said inlet thereof is smaller than said inlet to said other side channel for reducing backflow margin across said gill holes.

* * * * *